Patented Mar. 10, 1953

2,631,119

UNITED STATES PATENT OFFICE 2,631,119

THERAPEUTIC APPETITE SATIENT COMPOSITION

Edgar A. Ferguson, Jr., Brooklyn, N. Y.

No Drawing. Application August 25, 1950, Serial No. 181,589

6 Claims. (Cl. 167—55)

This invention relates to a new and improved therapeutic agent and is more particularly concerned with the production of a novel therapeutic appetite satient composition designed, upon oral administration, to curb the appetite, craving, or desire for fattening foods of higher calories, resulting in lessened rich food intake and eventually in reduction of weight.

Appetite satients have been known for many years but have not, until quite recently, become recognized as true medicinal agents. There are a number of elements involved in the process of satisfying or curbing the appetite. It is well known, of course, that the sight of some unpleasant material will cause the individual to lose his appetite. It is also well known that drinking water in large quantities causes a temporary loss of appetite due to dilution of the gastric juices and other causes. One of the most well known methods, and one which is widely practiced at the present time, is the eating of sweets before a meal. Evidently the eating of sweets causes a suppression of secretions, and perhaps the rise in blood sugar as it is absorbed in the system causes the appetite to be lost.

A method employed by physicians for many years has been the administration of atropine orally which causes drying of the throat. This dry feeling causes loss of appetite, but since it is coupled with suppression of gastric flow it is difficult to determine just what mechanism is involved in this therapy.

It has now been found, in accordance with the present invention, that there may be provided a composition of matter including a combination of specific flavoring ingredients which is highly effective to produce a markedly enhanced curbing of the appetite as compared with the drugs, sweets, and bulk agents known to the prior art.

It has been found that flavor is of prime importance in appetite satient therapy, because a large amount of satisfaction from the meal is derived from the flavor of the food. The traces of flavor left in the mouth, together with the effect of the flavors and flavoring substances in the blood stream, gives, in itself, a feeling of satisfaction or fullness.

More specifically, the novel appetite satient composition of the present invention includes sodium glutamate, salt, a protein hydrolysate, and glutamic acid.

Each of the foregoing ingredients has some efficacy in and of itself as an appetite satient. However, tests with each of the ingredients taken singly, or any combination of ingredients without sodium glutamate shows that, although their individual or combined satient effect is evident, it is not nearly as pronounced as when sodium glutamate is included in the composition along with at least one other ingredient of the composition. Conversely, sodium glutamate when employed alone has some appetite satient effect, but not nearly as much as the amount of satient effect noticeable when one or more of the other ingredients are employed therewith. In combination, all of the ingredients have a far superior appetite satient effect than would be expected from the additive satient qualities of the various individual components.

The combination of sodium glutamate and sodium chloride is most essential to the therapeutic effect of the present composition. Without sodium chloride, most of the satient effect is lost, although sodium glutamate gives a great degree of enhancement. Taken singly the order of effectivity is as follows: sodium glutamate, sodium chloride, glutamic acid and protein hydrolysate. First in importance as far as synergistic effect is concerned is sodium glutamate and sodium chloride. Without sodium glutamate the appetite satient effect is too small to be useful therapeutically. Without salt in the presence of sodium glutamate some effectivity is evident. However, in the presence of both salt and sodium glutamate the effect is most marked.

Experiments have shown that a solution of salt in water below a concentration of $\frac{8}{10}$ of 1% of salt is difficult to taste. However, when a small amount of sodium glutamate is added, even an amount as small as 0.2%, it is possible to detect the taste of salt even in less concentration than $\frac{8}{10}$ of 1%. Conversely, a small quantity of sodium glutamate such as ½ of 1% when added to water does not add any characteristic taste to the water. Even when 1½% to 2% sodium glutamate is added, there is but very little of the characteristic glutamate taste present. However, in the presence of as little as 0.4% salt, a strongly characteristic glutamate taste may be detected. This demonstrates quite conclusively the taste synergism existing between the sodium chloride and the sodium glutamate in the appetite satient composition of the present invention.

A solution of 3% sodium chloride may be taken by the teaspoonful without causing too marked a sensation of saltiness which would affect the appetite. However, when a small quantity in the order of ½ of 1% of sodium glutmate is added, the sodium chloride saltiness becomes inordinately greater and the effect on the appetite becomes more marked.

The protein hydrolysate, enhanced with glutamic acid, when added to a solution of salt and sodium glutamate, produces a characteristic flavor similar to that of heavy beef broth. The protein hydrolysate employed in the composition of the present invention may be any common protein hydrolysate which includes well known mixtures of amino acids usually produced in protein hydrolysis, along with unreacted protein. A typical protein hydrolysate useful in the practice of the present invention is one marketed under the name of "Yeastamin" and obtained by enzymatically digesting brewers yeast. During the course of digestion the cell membranes and other insoluble matter are removed. The final product has no reducing sugars and has less than 10% carbohydrate material. The protein content is about 70% as compared with 45% in dried brewers yeast. In addition, enzymatically digested brewers yeast contains the vitamin B complex fraction present in the original yeast. This enzymatically digested brewers yeast has a total nitrogen content of 11.2% and an amino nitrogen content of 6%. The amino acid content is broken down as follows:

| | Percent |
|---|---|
| Arginine | 4.0–4.8 |
| Histidine | 2.0–2.4 |
| Lysine | 3.9–4.5 |
| Tyrosine | .9–1.2 |
| Tryptopane | .5–0.7 |
| Phenylalanine | 2.5–3.5 |
| Cystine | .5– .6 |
| Methionine | 1.2–1.5 |
| Threonine | 3.0–3.5 |
| Leucine | 4.3–4.5 |
| Isoleucine | 3.0–3.5 |
| Valine | 3.0–3.5 |

It is understood, of course, that the protein hydrolysate may also be derived from acid or alkali digestion of other proteins such as casein, although yeast hydrolysate is preferred because of the vitamin content. In all cases, the amino acid mixture content of these hydrolysates approximates in composition that given above for the preferred yeast hydrolysate.

The essential ingredients of the appetite satient composition according to the present invention are compounded in the following proportions:

| | Grams |
|---|---|
| Protein hydrolysate | 100–400 |
| Sodium glutamate | 500–2500 |
| Glutamic acid | 50–200 |
| Sodium chloride | 300–700 |

A specific composition found useful in practicing the invention is as follows:

| | Grams |
|---|---|
| Protein hydrolysate | 257 |
| Sodium glutamate | 1787 |
| Glutamic acid | 137 |
| Sodium chloride | 550 |

The foregoing appetite satient compositions may be administered per se, although it is usually desirable to employ inert vehicles.

A particularly valuable vehicle for oral administration of the appetite satient composition is chewing gum. Any conventional chewing gum base may be employed, and in compounding the chewing gum product, 1½ to 5 grains and preferably 2½ grains of the appetite satient composition per conventional-sized stick or candy-coated lozenge of finished chewing gum product is incorporated in the chewing gum vehicle. As stated, any conventional chewing gum vehicle may be employed and the following formulations are given by way of example:

| | Percent |
|---|---|
| Gum base (resins and waxes) | 15–25 |
| Sucrose | 50–60 |
| Glucose | 15–25 |
| Softeners and fillers | 1– 5 |
| Polybutene (vistanex of molecular weight of 80,000) | 5 |
| Waxes | 50 |
| Resins | 25 |
| Softeners | 5 |
| Calcium carbonate | 5 |

The appetite satient composition of the present invention may also be administered orally through the use of wafers. The wafer may be made up from powdered sugar with flavoring material such as vanilla or chocolate. Specifically, a wafer is made up of 5 grams of powdered sugar containing 3 grains of the appetite satient composition, together with such excipients as chalk and sodium stearate to allow compression into wafer form, together with vanilla or chocolate as flavoring materials. Exemplary of wafer compositions produced in accordance with the invention is the following formulation:

| | | |
|---|---|---|
| Powdered sugar | grams | 5 |
| Appetite satient composition | grains | 3 |
| Chalk | do | 10 |
| Sodium stearate | grams | 4 |
| Vanillin | grains | 1 |
| Cocoa | do | 2 |

Either the chewing gum or the wafer is taken 15 to 30 minutes before meal-time to realize optimum satient effect.

What is claimed is:

1. A therapeutic appetite satient composition comprising sodium glutamate, sodium chloride, a protein hydrolysate and glutamic acid employed in the following approximate proportions:

| | Grams |
|---|---|
| Sodium glutamate | 500–2500 |
| Sodium chloride | 300– 700 |
| Protein hydrolysate | 100– 400 |
| Glutamic acid | 50– 200 |

2. A therapeutic appetite satient composition comprising sodium glutamate, sodium chloride, a protein hydrolysate and glutamic acid employed in the following approximate proportions:

| | Grams |
|---|---|
| Sodium glutamate | 1787 |
| Sodium chloride | 550 |
| Protein hydrolysate | 257 |
| Glutamic acid | 137 |

3. A chewing gum having incorporated therein, in an amount of 1½ to 5 grains per finished gum stick, a therapeutic appetite satient composition consisting essentially of a mixture of sodium glutamate, sodium chloride, a protein hydrolysate and glutamic acid, said mixture being present in the following approximate proportions:

| | Grams |
|---|---|
| Sodium glutamate | 500–2500 |
| Sodium chloride | 300– 700 |
| Protein hydrolysate | 100– 400 |
| Glutamic acid | 50– 200 |

4. A chewing gum having incorporated therein, in an amount of 1½ to 5 grains per finished gum stick, a therapeutic appetite satient composition consisting essentially of a mixture of sodium glutamate, sodium chloride, a protein hydrolysate and glutamic acid, said mixture being present in the following approximate proportions:

|  | Grams |
|---|---|
| Sodium glutamate | 1787 |
| Sodium chloride | 550 |
| Protein hydrolysate | 257 |
| Glutamic acid | 137 |

5. An edible wafer containing a therapeutic appetite satient composition consisting essentially of a mixture of sodium glutamate, sodium chloride, a protein hydrolysate and glutamic acid, said mixture being present in the following approximate proportions:

|  | Grams |
|---|---|
| Sodium glutamate | 500 to 2500 |
| Sodium chloride | 300 to 700 |
| Protein hydrolysate | 100 to 400 |
| Glutamic acid | 50 to 200 |

6. An edible wafer containing a therapeutic appetite satient composition consisting essentially of a mixture of sodium glutamate, sodium chloride, a protein hydrolysate and glutamic acid, said mixture being present in the following approximate proportions:

|  | Grams |
|---|---|
| Sodium glutamate | 1787 |
| Sodium chloride | 550 |
| Protein hydrolysate | 257 |
| Glutamic acid | 137 |

EDGAR A. FERGUSON, Jr.

REFERENCES CITED

The following references are of record in the file of this patent:

UNITED STATES PATENTS

| Number | Name | Date |
|---|---|---|
| 2,046,862 | Allen | July 7, 1936 |
| 2,192,326 | Nitardy | Mar. 5, 1940 |
| 2,426,634 | Melnick | Sept. 2, 1947 |

OTHER REFERENCES

Manufacturing Chemist, volume 16, page 461 (December 1945).